Figure 1:
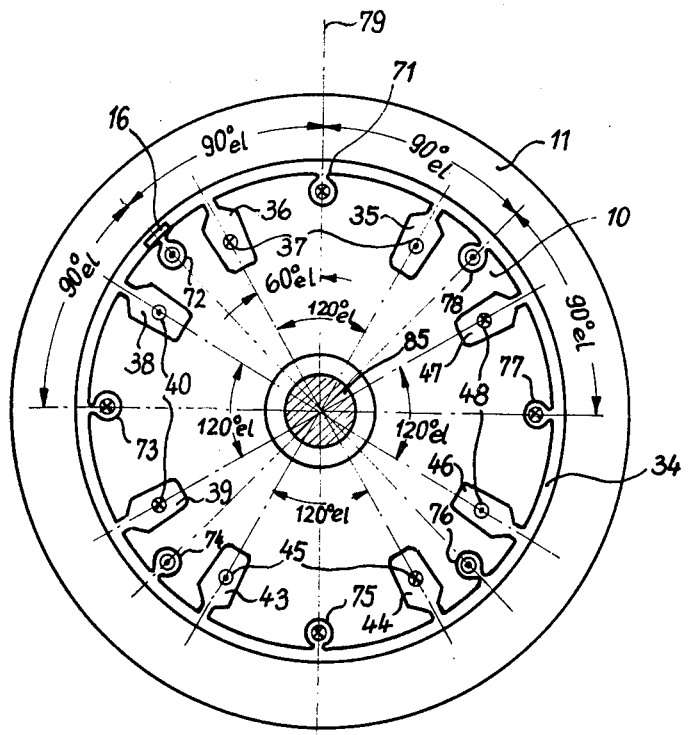

United States Patent [19]
Müller

[11] Patent Number: 4,481,440
[45] Date of Patent: Nov. 6, 1984

[54] PERMANENT MAGNET BRUSHLESS D-C MOTOR WITH ISOLATED SENSOR WINDING MEANS

[75] Inventor: Rolf Müller, St. Georgen, Fed. Rep. of Germany

[73] Assignee: Papst-Motoren KG, St. Georgen, Fed. Rep. of Germany

[21] Appl. No.: 481,268

[22] PCT Filed: Jan. 16, 1980

[86] PCT No.: PCT/EP80/00001
§ 371 Date: Sep. 17, 1980
§ 102(e) Date: Jul. 22, 1980

[87] PCT Pub. No.: WO80/01525
PCT Pub. Date: Jul. 24, 1980

Related U.S. Application Data
[63] Continuation of Ser. No. 206,481, Sep. 17, 1980.

[30] Foreign Application Priority Data
Jan. 17, 1979 [DE] Fed. Rep. of Germany ....... 2730142

[51] Int. Cl.³ .............................................. H02K 3/04
[52] U.S. Cl. .................................... 310/268; 310/156; 310/168; 318/254
[58] Field of Search ............... 310/67, 68 R, 156, 268, 310/67 R, 68 R, 152, 156, 168, 268; 318/254

[56] References Cited
U.S. PATENT DOCUMENTS

| | | | |
|---|---|---|---|
| 3,045,197 | 7/1962 | Vanslette | 310/168 |
| 4,093,897 | 6/1978 | Fujita et al. | 310/268 |
| 4,109,170 | 8/1978 | Fujita et al. | 310/68 R |
| 4,125,792 | 11/1978 | Schmider | 310/268 |
| 4,211,963 | 7/1980 | Mueller | 310/268 |

FOREIGN PATENT DOCUMENTS

| | | | |
|---|---|---|---|
| 979578 | 1/1965 | United Kingdom | 310/268 |
| 2000646 | 1/1979 | United Kingdom | 310/268 |

Primary Examiner—J. D. Miller
Assistant Examiner—D. S. Rebsch
Attorney, Agent, or Firm—Frishauf, Holtz, Goodman & Woodward

[57] ABSTRACT

To provide an actual speed output signal upon operation of a permanent magnet motor having a generally trapozoidal or rectangular magnetic flux distribution, and the armature includes a plurality of pulse-energized strands, a sensor winding is placed on the armature and so located that it will pick up a harmonic of flux induced in a conductor to be cut by the rotating flux due to the rotor so that the output speed signal will be a multiple and thus readily analyzable with respect to actual speed in electronic circuitry. The sensor winding extends, preferably, in the same armature slots, or adjacent the armature windings, to be cut by all the flux derived by the rotor so that special winding locations on the armature can be avoided and the sensor winding placed on the armature in conventional positions thereof.

29 Claims, 48 Drawing Figures

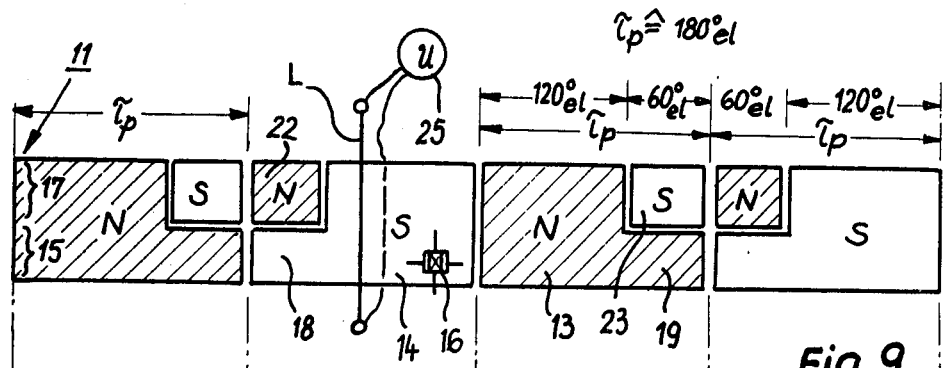
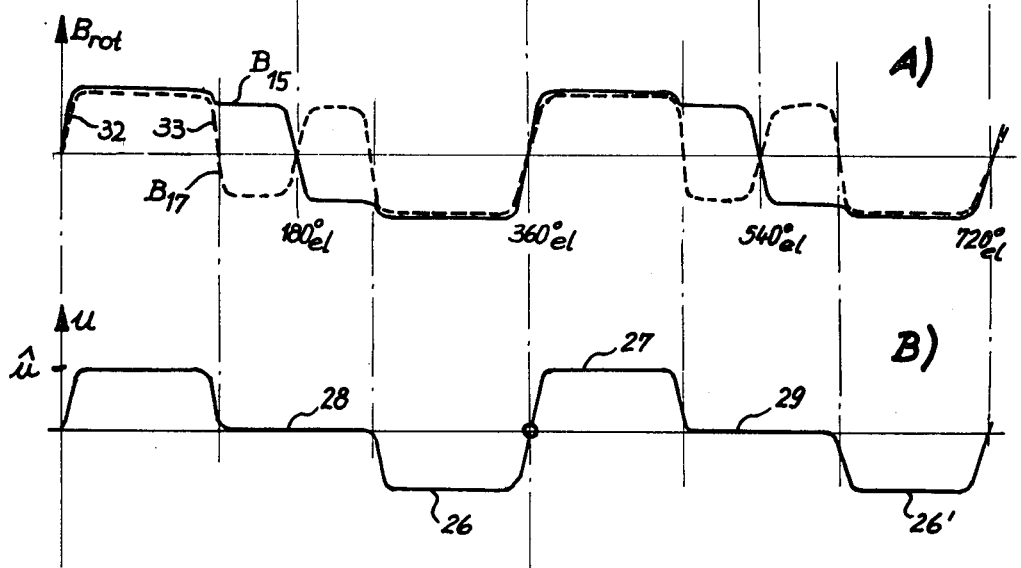
Fig. 9
Fig. 10
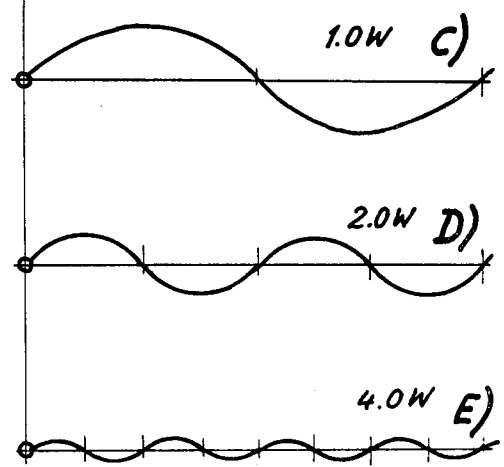

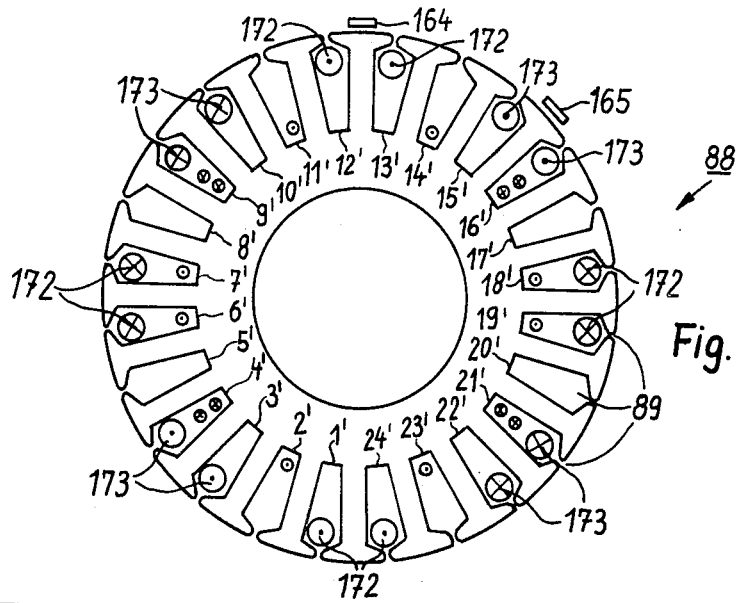
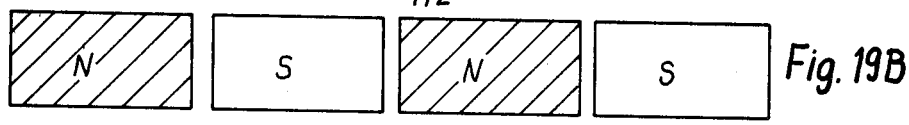
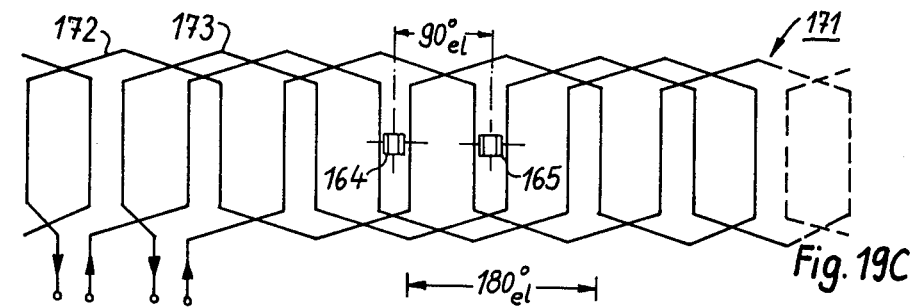
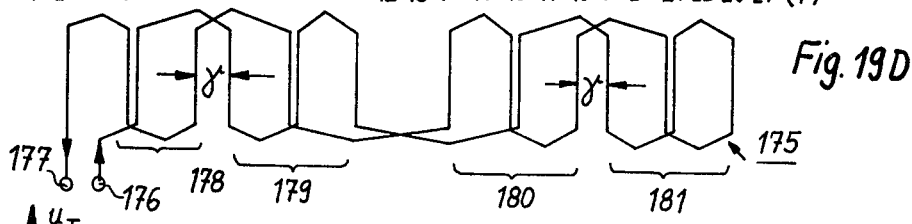
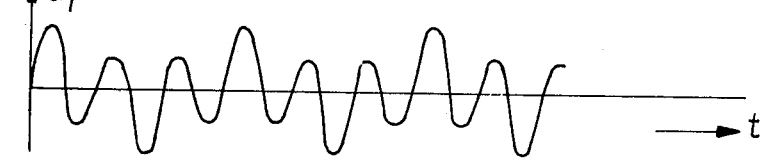

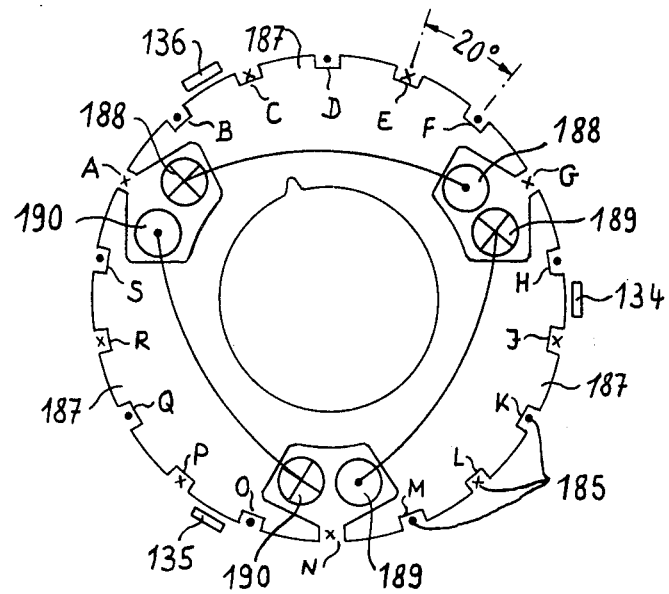
Fig. 20A
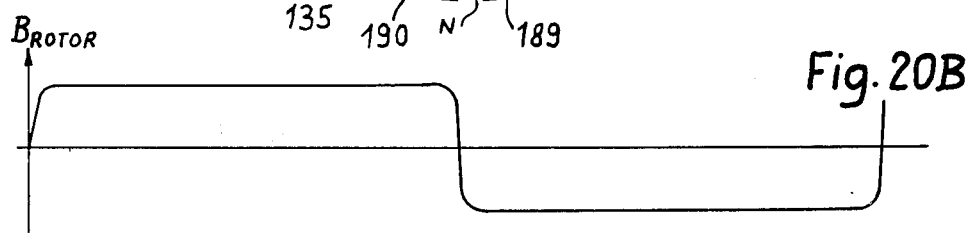
Fig. 20B
Fig. 20C
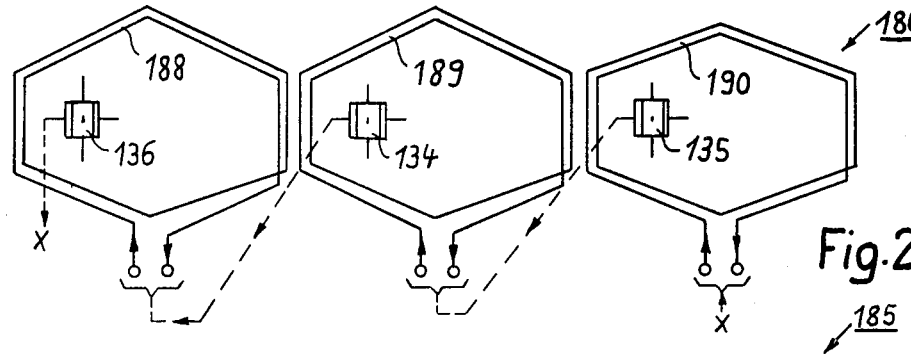
Fig. 20D
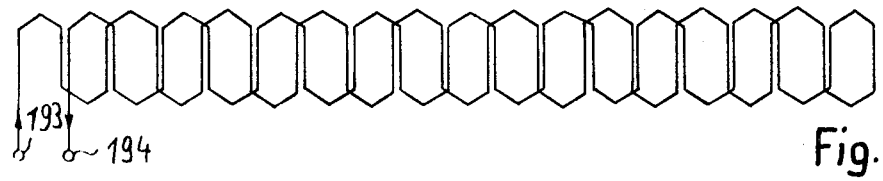
Fig. 20E

PERMANENT MAGNET BRUSHLESS D-C MOTOR WITH ISOLATED SENSOR WINDING MEANS

This application is a continuation of application Ser. No. 206,481 filed Sept. 17, 1980.

The invention relates to a brushless d-c motor with a permanent magnet rotor, in which the poles, when viewed in the direction of rotation, have an approximately rectangular or trapezoidal magnetization curves.

BACKGROUND

It is known to obtain pulses from the main winding of a brushless d-c motor when the motor operates. The frequency of the pulses is proportional to the instantaneous rotor speed and can therefore be used for measuring or controlling the motor speed. However, the frequency is relatively low, to wit, $p \times \omega_{mech}$, wherein p is the number of pole pairs and $\omega_{mech}$ is the angular velocity of the rotor per second. The main, or power current flowing in the winding of the motor affects the pulses in their relative phase position with respect to each other and relative to the position of the rotor. A speed control employing these pulses for comparing nominal or command values and actual values is undesirably affected and continuous oscillations of the rotor may result.

THE INVENTION

It is an object to provide a brushless d-c motor which generates pulses having a sufficiently high frequency proportional to the motor speed, that are, preferably, uninfluenced by the power currents flowing in the main winding of the motor, and which has low equipment requirements.

Briefly, in accordance with the invention, the stator of the motor has a sensor winding thereon for picking up and coupling-out at least one harmonic wave of the voltage induced in the stator by the rotor poles; the sensor winding is matched to the number of rotor poles which is equal to the product (2p ×L), wherein 2p is the actual number of poles of the rotor, and L is the ordinal number of the harmonic wave to be picked up. The special harmonic fields included in the nonsinusoidally magnetized poles induce voltages in the sensor winding in this manner corresponding to that harmonic wave for which the sensor winding is dimensioned. The fundamental wave is substantially or completely suppressed. Advantageously the sensor winding is located such that transformer coupling between it and the main winding is avoided. This is achieved by a special selection of the spacial phase position between the main winding and the sensor winding, or by omission of several winding steps and/or spacial phase shifting of part of the sensor winding with respect to another part thereof.

A particularly simple arrangement of the sensor winding results when separate slots are provided for the same having a position exactly defined relative to the main winding. For economic reasons it is advantageous to place the sensor winding directly into the slots of the main winding, since then no additional slots are required for the sensor winding. Transformer coupling with the main winding can still be avoided by forming the sensor winding with two simple wave windings shifted relative to each other by a predetermined angle. In certain cases individual winding steps have to be omitted.

DRAWINGS

Figure 2:
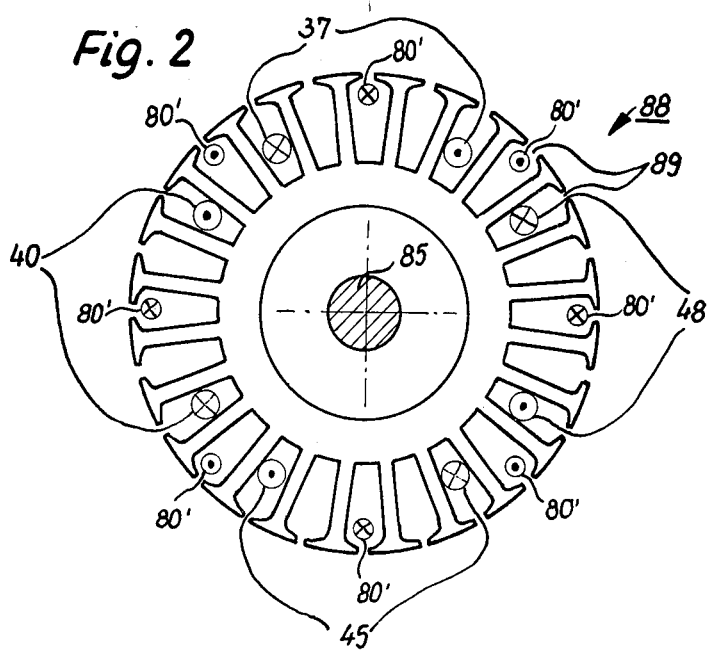
Figure 3A:
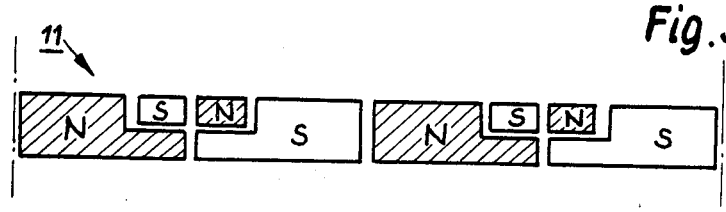
Figure 3B:
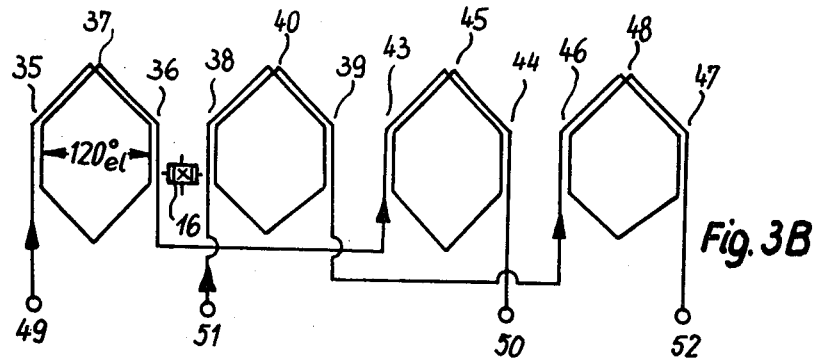
Figure 3C:
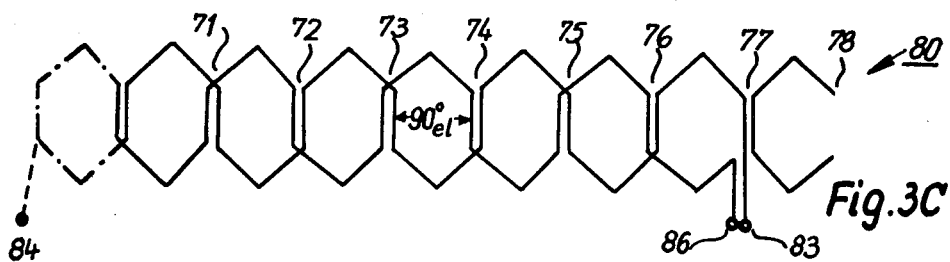
Figure 4:
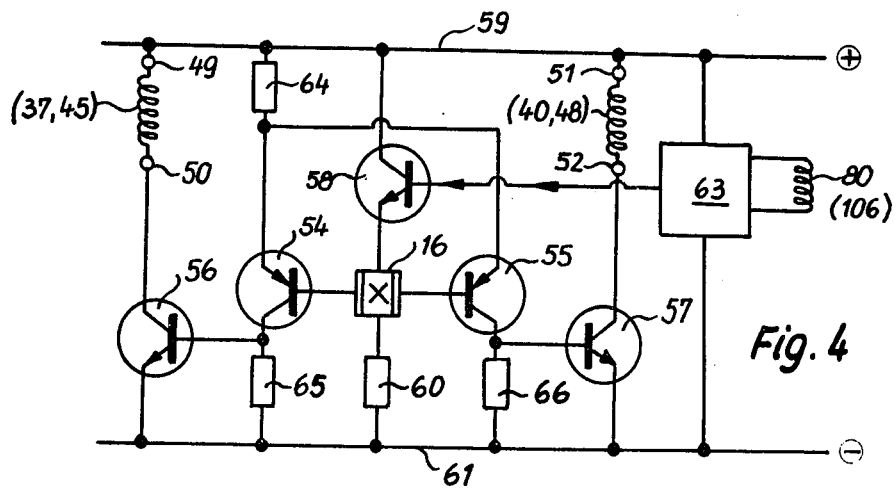
Figure 5:
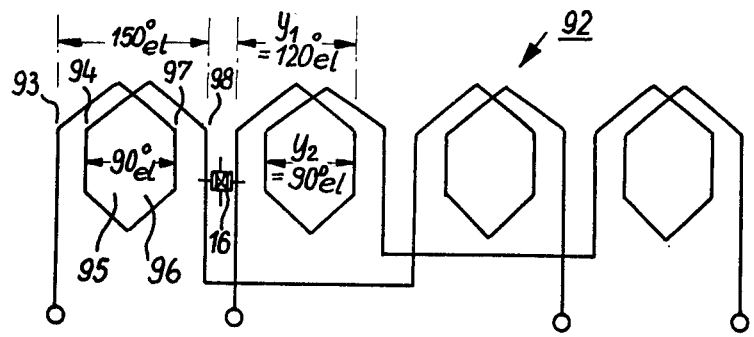
Figure 6:
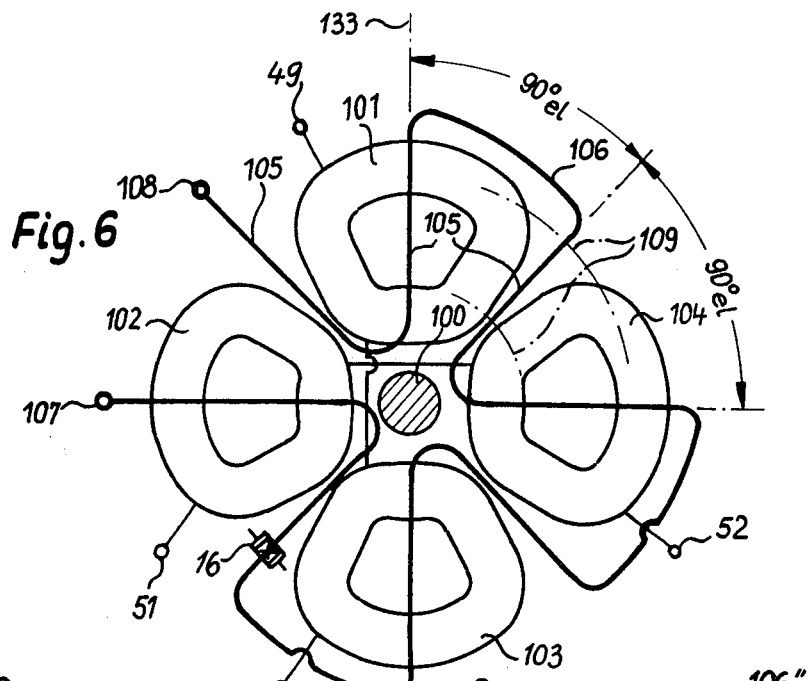
Figures 7, 8:
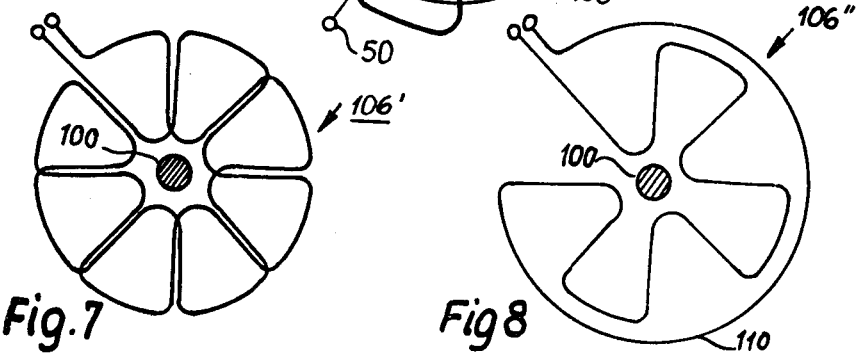
Figure 11:
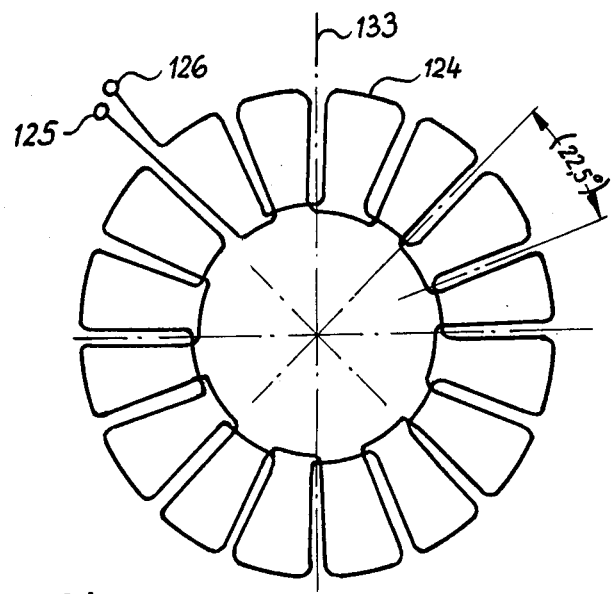
Figure 12:
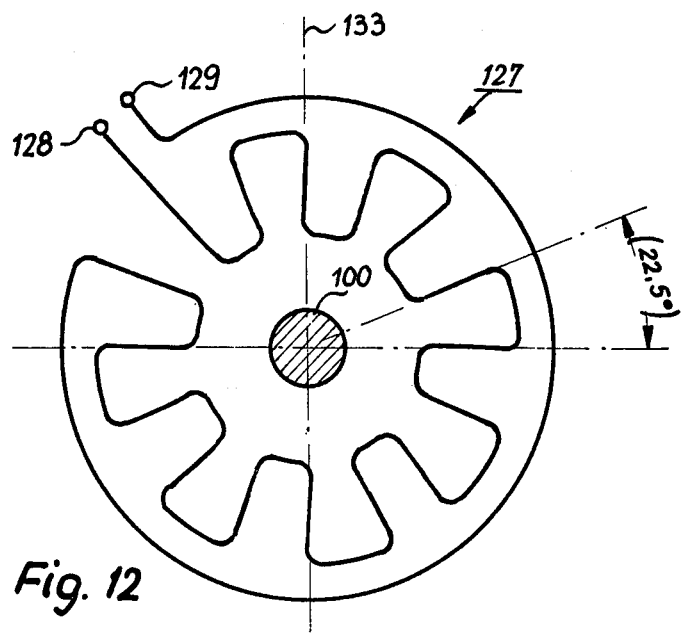
Figure 13:
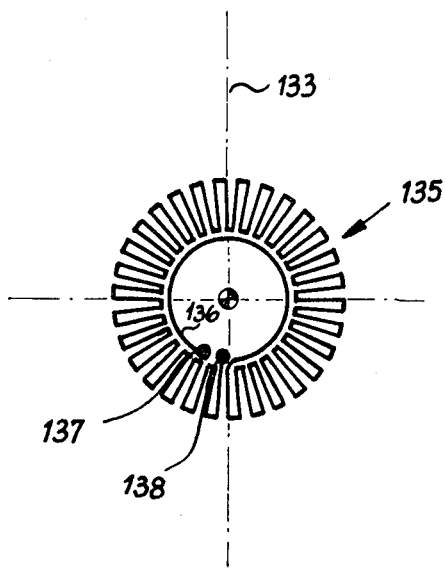
Figure 14A:
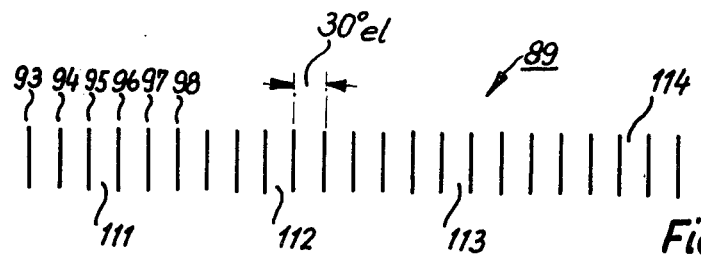
Figure 14B:
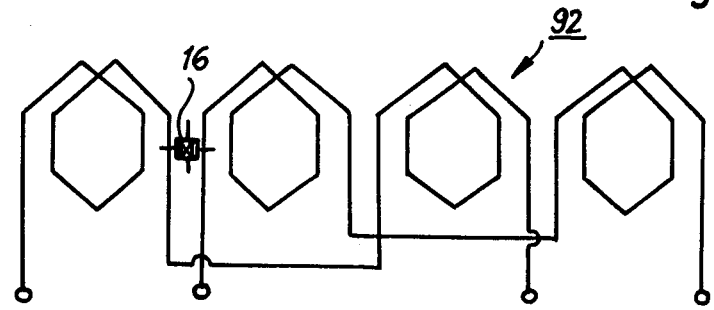
Figure 14C:
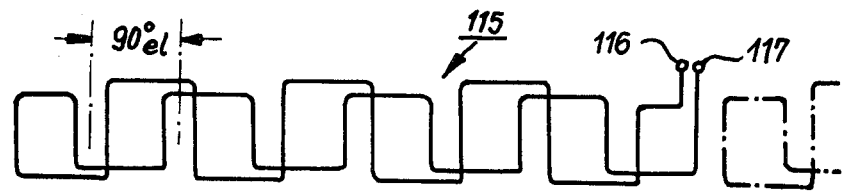
Figure 14D:
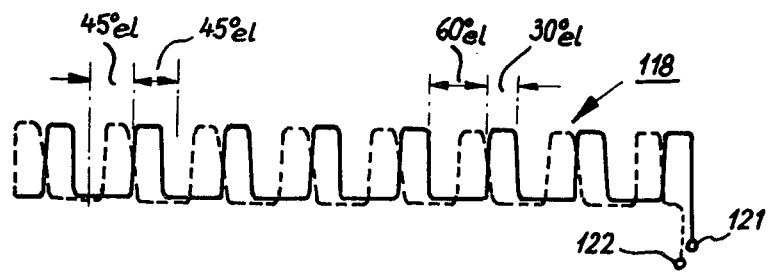
Figures 10B, 15:
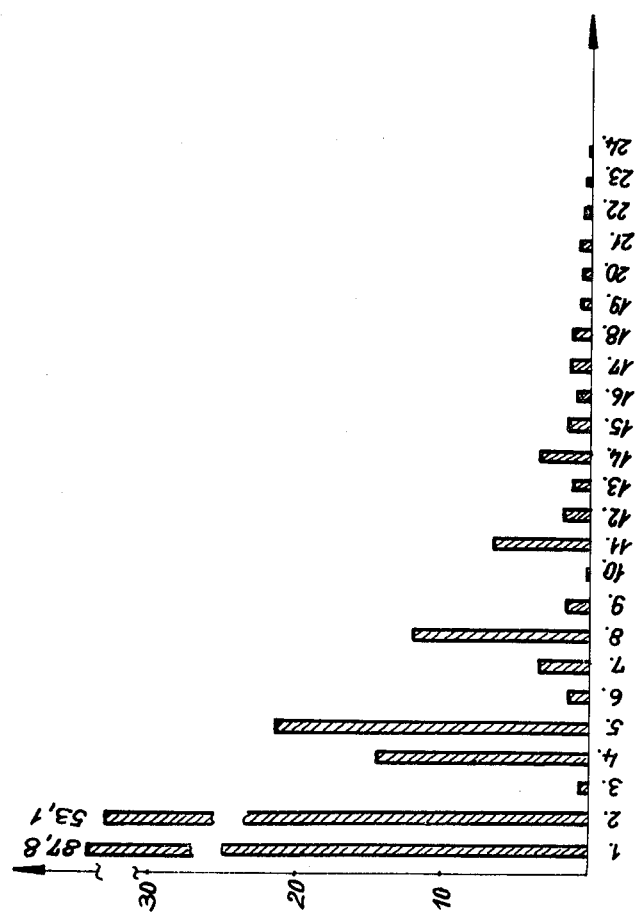
Figure 16A:
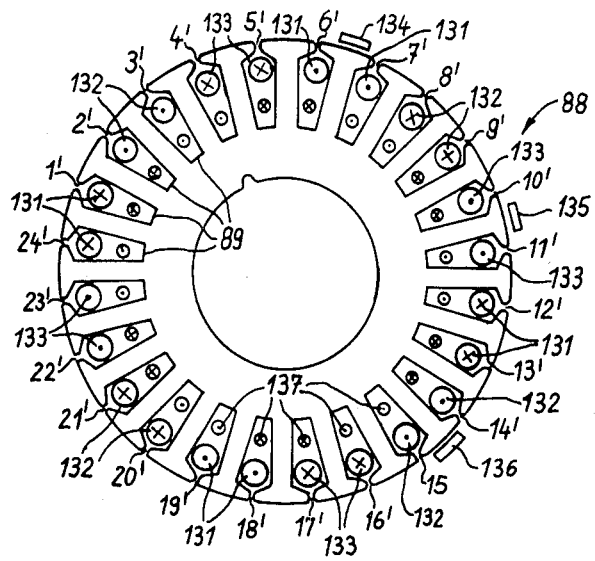
Figure 16B:
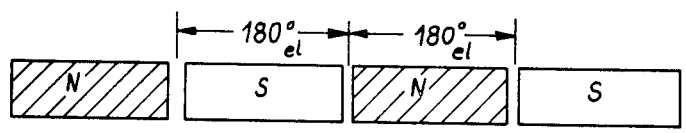
Figure 16C:
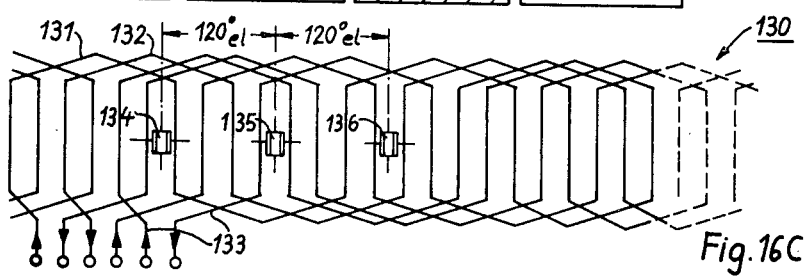
Figure 16D:
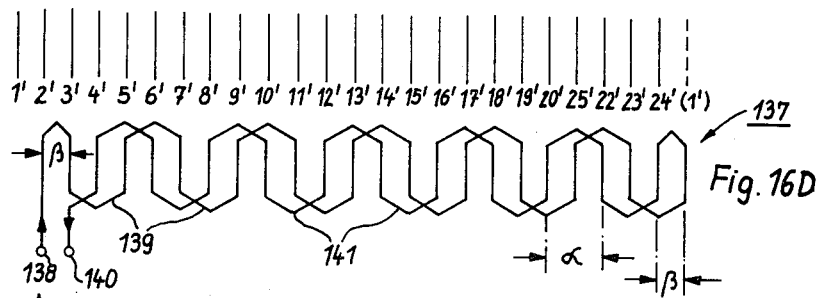

FIG. 1 is a sectional view through a cylindrical air gap motor illustrating a first embodiment of the invention, FIG. 2 is a sectional view through the stator of a second embodiment, FIGS. 3A-3C are diagrams explaining FIGS. 1 and 2, FIG. 4 is a circuit diagram explaining the invention, FIG. 5 is a diagram of a variant of FIG. 3B showing main windings employed with the sheet metal stamping of FIG. 2, which windings can be advantageously employed even independently of the sensor winding, FIG. 6 is a plan view of the stator winding of a four pole motor with flat, or axial air gap and a sensor winding suitable for decoupling of the second harmonic wave, FIG. 7 is an alternative type of the sensor winding of FIG. 6, which is particularly suitable for flat motors having an axial stray field, FIG. 8 is a second alternative type of the sensor winding of FIG. 6, which is also particularly suitable for flat motors having an axial stray field, FIG. 9 is an enlarged representation of the developed magnetization represented in FIG. 3A of a rotor for a cylindrical air gap, FIG. 10A is the magnetization curve of the rotor, shown developed in FIG. 9, FIG. 10B is the induced voltage curve in the conductor L according to FIG. 9 upon a complete revolution, FIGS. 10C, D, E are the fundamental, the second and fourth harmonic wave of the voltage shown in FIG. 10B, FIG. 11 is a plan view of a sensor winding for obtaining the fourth harmonic of the motor shown in FIG. 6, FIG. 12 is a variant of FIG. 11, also for the fourth harmonic, FIG. 13 is a sensor winding for obtaining the 15th harmonic of the motor shown in FIG. 6, to a slightly reduced scale, FIGS. 14A-14D are diagrams illustrating the construction of a sensor winding for obtaining the second harmonic (FIG. 14C) and the fourth harmonic (FIG. 14D), respectively, of a cylindrical air gap, external rotor motor employing the sheet metal stamping shown in FIG. 2 and the type of stator winding shown in FIG. 5, FIG. 15 is the frequency spectrum resulting from analysis of the voltage μ shown in FIG. 10B, wherein the amplitude of the fundamental and of the first harmonic is shown only numerically, FIGS. 16A-16E are diagrams of a four pole, three strand, three pulse brushless d-c motor, which is formed as an external rotor motor and the stator of which has a sheet metal stamping with 24 equally distributed slots 1'-24', into which are wound the three strands of the stator winding, and a sensor winding, for obtaining the third harmonic, separately shown in FIG. 16D.

Figure 17A:
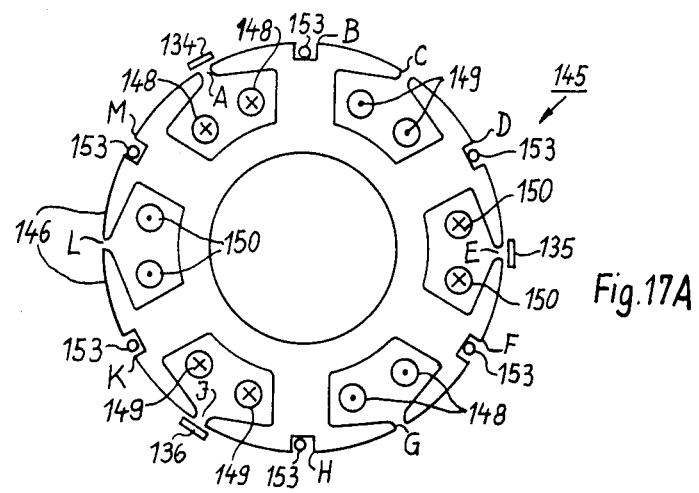
Figure 17B:
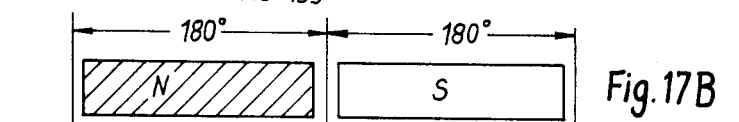
Figure 17C:
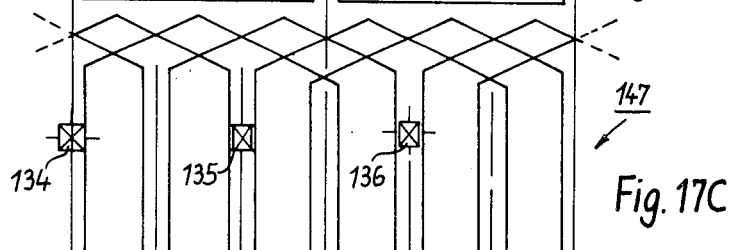
Figure 17D:
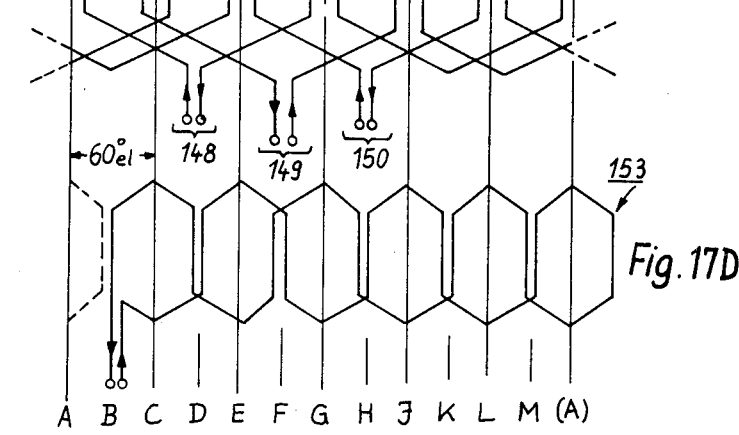
Figure 17E:
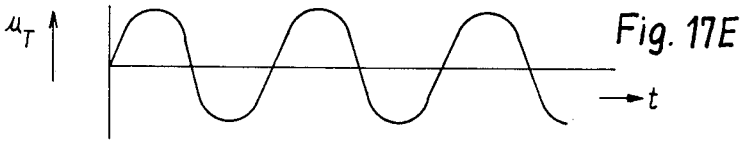
Figure 18A:
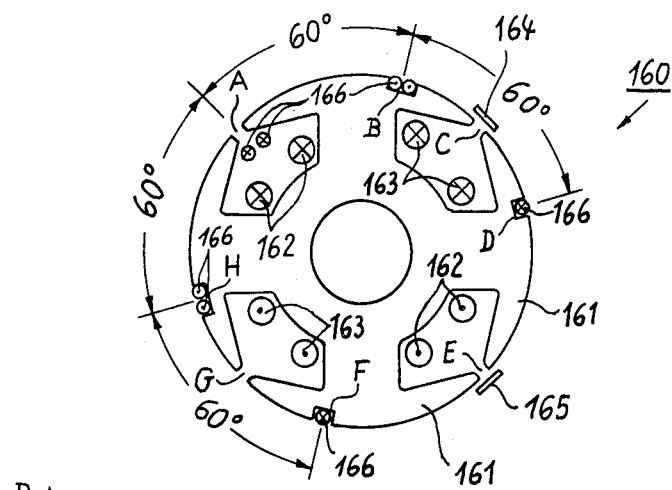
Figure 18B:
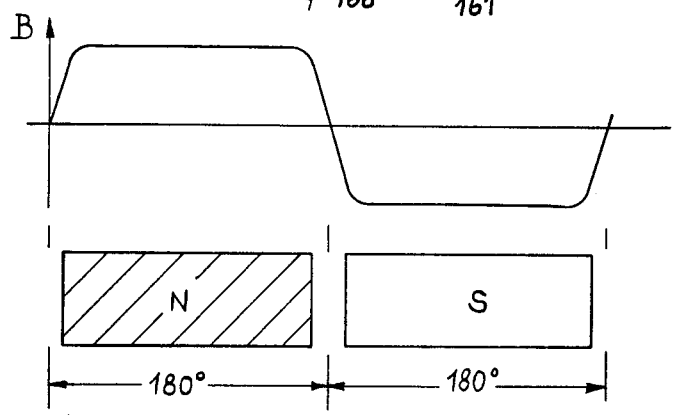
Figure 18C:
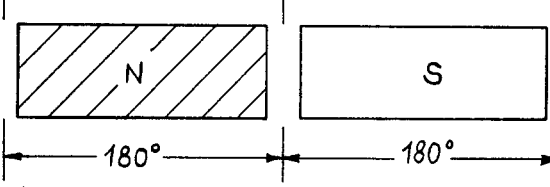
Figure 18D:
Figure 18E:
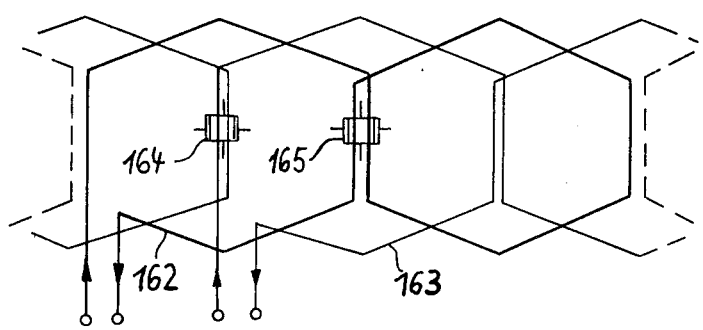
Figure 18F:
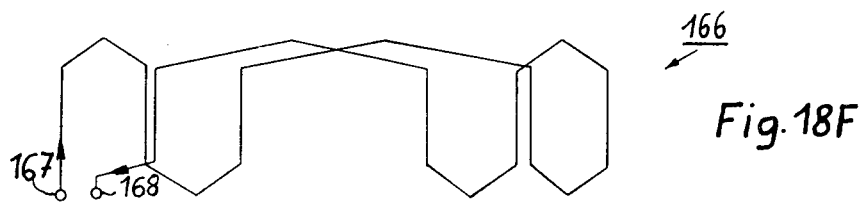

FIGS. 17A-17E are diagrams of a two pole, three strand, three pulse brushless d-c motor, which is formed as an external rotor motor and the stator sheet metal package of which has 6 equally distributed salient T-poles, as well as 6 auxiliary slots B, D, F, H, K and M for receiving a sensor winding for obtaining the third harmonic separately shown in FIG. 17D, FIGS. 18A-18F are diagrams of a two pole, two strand, four pulse brushless d-c motor which is formed as an external rotor motor and the stator sheet metal package of which has four equally distributed salient T-poles and four auxiliary slots B, D, F and H wherein the sensor winding, separately shown in FIG. 18F, is constructed for obtaining the third harmonic and is positioned to prevent transformer coupling with the main winding, FIGS. 19A–19E are diagrams of a four pole, two strand, four pulse brushless d-c motor, which is formed as an external rotor motor and the stator sheet metal package which is identical to that of FIG. 16A and which has the two strands of the stator winding, as well as the sensor winding separately shown in FIG. 19D for obtaining the third harmonic.

Figure 21:
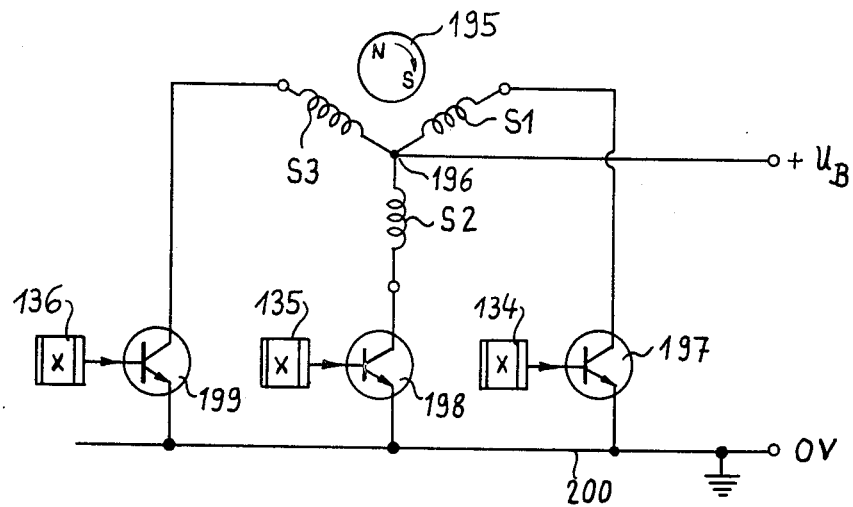

FIGS. 20A–20E are diagrams of a two pole, three strand, three pulse brushless d-c motor formed as an external rotor motor, the stator sheet metal package of which comprises three equally distributed salient poles, as well as 15 auxiliary slots for receiving the sensor winding shown separately in FIG. 20E for obtaining the ninth harmonic, FIG. 21 is a basic circuit diagram for operating the motors according to FIG. 16, FIG. 17 and FIG. 20, and FIG. 22 is a basic circuit diagram for operating the motors according to FIG. 18 or FIG. 19.

FIG. 1 shows a stator sheet metal package 10 for an external rotor motor having a permanent magnet external rotor 11 and shown only schematically. This magnetization of the rotor 11 is shown in developed form in FIGS. 3A and 9. The angles spanned by the rotor are indicated in FIG. 9 for reference purposes. Two unlike monopole zones always meet directly, for example in FIG. 9, a north pole zone 13 and a south pole zone 14, each 120° electrical long.

A galvanomagnetic sensor 16, in general a Hall-generator, is attached at the stator, located in a position spanned by track 15 (FIG. 9). The south monopole zone 14 is extended toward the left by an extension 18 of 60° electrical. The north monopole zone 13 is extended toward the right by an extension 19 by 60° electrical. The circular path or track 17 has, next to the extension 18, a zone 22 (north pole) and next to the extension 19, a zone 23 (south pole). The extension 18 and the zone 22 and similarly the extension 19 and the zone 23 form a dipole zone, see FIGS. 3A and 9. The circular paths or tracks 15 and 17 have about the same width.

FIG. 10A shows the distribution of magnetization of the rotor 11 shown in FIG. 9. Curve $B_{15}$, in solid lines, shows the magnetization curve of path 15 sensed by sensor 16; in addition the course of the magnetization of path 17 is shown in dashed lines $B_{17}$. The curves $B_{15}$ and $B_{17}$ are identical over all four monopole zones of rotor 11. They differ at the dipole zones 18, 22 and 19, 23. Voltage $\mu$ induced in conductor L (FIG. 9) placed across the full width of the rotor 11 and upon uniform relative motion between the rotor 11 and the conductor L is shown in FIG. 10B. An instrument 25, for example an oscilloscope, is used to measure the induced voltage $\mu$. As can be seen from FIG. 10B, the monopole zone 14 induces, for example, a negative voltage 26, and the monopole zone 13, a positive voltage 27. The dipole zone formed by the extension 18 and the north pole 22 induces two identical oppositely directed voltages, the sum of which is zero, see curve section 28 in FIG. 10B. The same is true for the extension 19 and the south pole 23 which again together induce the voltage zero, which corresponds to section 29 in FIG. 10B. To the right of this curve section 29, a curve section 26' follows, which respective to its form is identical to section 26.

By placing the zero point of the abscissa axis between the sections 26 and 27, the voltage $\mu$ will be a complementary trigonometric function, that is $f(t) = -f(-t)$. This function can be analyzed by Fourier analysis into sine curves of different frequencies and amplitudes, of which FIG. 10C shows the fundamental, FIG. 10D the second harmonic and FIG. 10E the fourth harmonic. The third and the sixth harmonic are approximately equal to zero. The FIGS. 10C to 10E only show the Fourier analysis of the voltage $\mu$ of FIG. 10B in its fundamental and the next few harmonics. Of course, further harmonic waves are present, and FIG. 15 shows the full frequency spectrum, that is, the absolute values of the amplitudes of the individual harmonic waves of the voltage shown in FIG. 10B to the 24th harmonic. The harmonic waves having an ordinal number 1 divisible by three have very small amplitudes. The harmonic waves with the ordinal numbers 2, 4, 5, 7, 8, 11 and 14 based on their relatively large amplitudes are most suitable for evaluation. Useful signals are available when the slopes of the voltage shown in FIG. 10B are steep in high order harmonics. When the slopes are less steep, then practically only the second, fourth, fifth and eighth harmonic can be evaluated.

The individual harmonic waves can be filtered in the usual way, for example by way of band pass filters, from the voltage which is obtained from the analysis device 25 (FIG. 9). This method is cumbersome and has the disadvantage of providing a control signal only when the motor reaches the desired speed of rotation. Starting has to be achieved in a different way.

In accordance with a preferred embodiment of the invention, the harmonic waves are coupled-out, i.e. obtained so as to be available at any speed.

For purposes of explanation, consider the rotor 11 to be composed of different magnets, with each providing output waves due to the magnets according to FIGS. 10C, 10D, 10E, etc. Further harmonic waves can be numerically easily calculated in the usual way. From these—fictitious—waves due to the rotor magnetizations, a certain one has to be taken and evaluated for the generation of the harmonic wave corresponding thereto. A sensor winding is used having a distance of the magnetically active winding sections adapted to this—fictitious—magnet, the sensor winding. Acting as a harmonic analyzer, coupling-out primarily only the selected harmonic from the total of harmonic waves present.

A coreless stator can be employed for the invention and this variant is explained in FIGS. 6 to 8. Initially, the invention will be explained with a stator made of slotted iron laminae and more particularly having the stator sheet metal package 10 shown in FIG. 1, viz., an external rotor motor. The adaptation to an internal rotor motor requires merely using the cylindrical air gap 34 as a mirror and inverting rotor and stator.

The stator sheet metal page 10, FIG. 1 has eight slots to receive four main windings: slots 35, 36 for a main winding 37; slots 38, 39 for a main winding 40; slots 43, 44 for a main winding 45; slots 46, 47 for a main winding 48. The two slots of a main winding in each case are separated by 120° electrical, and the individual main windings in each case have an angular distance of 180° electrical from each other, that is they are as shown equally distributed around the circumference of the stator sheet metal package 10.

FIGS. 3A to 3C show the motor of FIG. 1 in developed representation. The figures are exploded for ease of analysis; the three components are drawn, one beneath the other, in proper position. In operation, naturally, the position of the stator and rotor 11 constantly change relative to each other. The main windings 37 and 45 have terminals 49, 50 and are connected in series (of course, a parallel connection would be possible). Similarly, the main windings 40 and 48 are connected in series; they have its terminals 51 and 52.

FIG. 4 shows the position of the main windings in a corresponding circuit controlled by a Hall-generator 16 placed exactly in the center between the main windings 37 and 40 at the stator 10; compare FIGS. 1 and 3B. The Hall-generator 16 controls two pnp-transistors 54,55 of a differential amplifier. The transistors 54,55 serve as driving elements for npn output stage transistors 56,57 of which transistor 56 controls the current in the main windings 40 and 48 and transistor 57 controls the current in the main windings 40 and 48. One of the terminals of the Hall-generator 16 is connected via an npn-transistor 58 serving as a variable resistor to the plus-line 59 and the other terminal via a resistor 60 to the minus-line 61. The emitters of transistors 54 and 55 are connected to each other and via a common resistor 64 to bus 59. The collector of transistor 54 is connected via a resistor 65 to bus 61 and directly to the base of transistor 57. The windings 37, 45 are connected with their terminal 50 to the collector of transistor 56 and by terminal 49 to the plus-line 59. Similarly, the windings 40,48 are connected by their terminal 52 to the collector of transistor 57 and with their terminal 51 to the plus-line 59. A controlled gain amplifier 63 controls the conduction of transistor 58, which in the present case controls the speed via the control current flowing into the Hall-generator 16. A sensor winding 80, responding to the second harmonic, determines actual speed. Its construction is described below.

The operation of the circuit according to FIG. 4 is disclosed in detail in the German Patent Disclosure Document DE-OS No. 27 30 142, especially FIG. 2.

For receiving the sensor winding 80 to pick up the second harmonic, the stator sheet metal 10 has eight auxiliary slots 71 to 78 (FIG. 1), equally distributed around the stator circumference and having an angular distance from each other of 90° electrical. The position of all slots relative to each other is shown in FIGS. 3B and 3C to scale and designated with the same reference numbers. For example, it is seen that the auxiliary slot 71 (FIG. 3C) is located exactly in the center between the main slots 35 and 36, that the auxiliary slot 72 is located exactly in the middle between the main slots 36 and 38, etc., that is, the slot arrangement of FIG. 1 shows mirror symmetry. If one of the two stator halves is reflected along one of the symmetry axes, for example the axis 79 (FIG. 1), corresponding slots will coincide, for example 35 and 36, 78 and 72, etc. The winding 80 according to FIG. 3C is a wave winding which is looped back into itself, that is, the winding goes from terminal 83 through the slot 77, to the slot 76, then to the slot 75, slots 74, 73, 72 to the slot 71 and from there back to the slot 78 and the slot 77. There the direction of the winding is reversed, and the winding now runs in reverse direction again through slot 78, then slots 71 to 76 and is then run to the outside very close to the terminal 83. If the sensor winding 80 would end at the slot 77 (terminal 84 in FIG. 3C shown with dashed lines), the same harmonic of the induced voltage would be covered, but the amplitude would only be half as large and, in particular, such winding would also pick up pulsating stray fields, which run parallel to the rotor shaft 85 (FIG. 1).

By returning the sensor winding by the same angle of rotation of 720° electrical to the starting point, axial stray fields induce voltages of equal and opposite magnitude in the sensor winding 80, which cancel each other and thus do not influence the gain controlled amplifier 63 and hence the quality of the control. Naturally, for increasing the starting voltage, the sensor winding can be wound around the stator 10 several times, for example two full revolutions, and then returned by the same angle to the starting point. The individual magnetically active sections of the sensor winding 80 (in the slots 71 to 78) each have an angular distance from each other of (180° electrical: $L + n \times 180°$ electrical), wherein $n = 0, 1, 2, \ldots$ and $L =$ ordinal number of the harmonic to be covered. In the present case $L = 2$ and $n = 0$, and therefore this angle is 90° electrical. The sensor winding 80 comprises at least two magnetically active sections. It covers the second harmonic of the rotor magnetization shown in FIG. 10D and generates therefor a measuring voltage of twice the base frequency of the wave which can be obtained from the Hall-generator 16. In addition, the zero passages have substantially more uniform distances compared to the zero passages of the Hall-voltage. In such a motor, for example, the Hall-generator 16 provides four pulses per revolution, the sensor winding 80 in contrast eight pulses per revolution. In case the speed controller 63 (FIG. 4) is constructed for the evaluation of the frequency (and not of the amplitude) of the voltage applied to it, a very accurate speed control with good long term stability and small temperature dependence can be achieved. Such a speed controller shown for example in the German Patent Disclosure DE-OS Document No. 26 16 044.

Example: A sheet metal package similar to FIG. 1 had a diameter of 80 mm and a thickness of 18 mm. A one wire sensor winding 80 was wound according to FIG. 3C. The rotor magnet 11 had an induction of 1.2 kG. At a speed of 3600 rpm, an a-c voltage with an effective value of 0.3 volts resulted between the terminals 83 and 86. It is a particular advantage of the described mirror symmetrical arrangement of the sensor winding 80 that the induced voltages in it transformed from the main windings cancel each other and therefore do not interfere with the control process.

The arrangement according to FIG. 1 has the disadvantage that a special sheet metal stamping is required, which is only economical with large numbers of motors. The invention, however, can also be realized with commercial sheet metal stampings and this is shown in FIG. 2 in connection with FIGS. 3A to 3C. The same reference numbers are used for the same or equally acting parts as were used in the previous part of the description.

The sheet metal stamping 88 is also intended for a four pole motor with external rotor corresponding exactly to the rotor of FIG. 1 and reference is made to the description theerein. The sheet metal stamping 88 has 24 slots 89 of identical shape, which, each, have a distance from the other of 15° mechanical = 30° electrical. The individual windings are positioned completely identically with those of FIG. 1 such that in total eight slots remain without windings. The first main winding is here again designated as 37, and the two slots around which it is wound have a distance from each other of 120° electrical.

The second main winding is designated as 40, the third main winding is designated as 45 and the fourth main winding is designated as 48. They are, as shown, equally distributed around the stator circumference and are formed like the main winding 37. The magnetically active sections of the sensor winding 80 are designated as 80′ and have, each, a distance of 90° electrical from each other, and each lies on the bisecting line between two two neighboring slots of the main windings in order to avoid as described transformer coupling between the main windings and the sensor winding. The arrangement of the sensor winding 80 is identical to that of the scheme according to FIG. 3C and the corresponding description is referred to.

In case it is desired to wind more copper into the sheet metal stamping according to FIG. 2, the loop winding 92 shown in FIG. 5 can be employed instead of the winding pattern according to FIG. 3B. In accordance with FIG. 5, two winding sections are placed in two neighboring slots 93 and 94, then two empty slots 95 and 96 follow, and then again two slots 97 and 98 with windings follow. The larger angle step $y_1$ amounts to 120° electrical and the smaller angle step $y_2$ amounts to 90° electrical. The angles are explicitly shown in FIG. 5. This embodiment of the winding results in a better copper space factor, the induced voltage is somewhat smoothed and a more favorable curve of the torque generated by the motor results. It is a disadvantage of this arrangement that the sensor winding can no longer be positioned exactly mirror symmetrically relative to the main windings, since in FIG. 5 the sensor winding should be either in slot 95 or in slot 96. In case the slot number is doubled in a conventional metal stamping, then of course the sensor winding can also, with the winding pattern of FIG. 5, be arranged with mirror symmetry, since then between the slots 95 and 96 an additional slot is located into which the sensor winding of the corresponding section can be placed. The main winding is then advantageously distributed over six or eight slots, whereas, in FIG. 5, it is distributed only over 4 slots. This problem can also be solved without an increase of the number of slots by a further step of the invention and is referred to in FIGS. 14A to 14D.

FIG. 14A shows the 24 slots 89 of the stator sheet metal package according to FIG. 2 in the usual developed way. FIG. 14B shows the arrangement of the stator winding 92 relative to the slots 89 of FIG. 14A. The stator winding is identical to that of FIG. 5 and therefore is here not described again. As explained, this arrangement results in a more favorable torque curve compared with the arrangement of FIG. 1. The embodiment of FIG. 1 is not particularly suitable for industrial electric motors; it is included herein primarily for explaining the basic principle of the invention.

In the arrangement of the stator winding 92, FIG. 14, a tooth is always positioned in the center of a stator pole; in FIG. 14A there are positioned the teeth 111, 112, 113 and 114.

In accordance with a feature of the invention, the "center tooth" is given a position of symmetry, by having a like magnetically active winding section, located at each side thereof. "Like", in this context, shall means that when d-c flows through the sensor winding, the same current direction is present on both sides of the tooth. Thus, even in this case, the sensor winding is not transformer coupled with the individual stator windings. The angle indications to the FIGS. 14C and 14D refer, as in the preceding, to the angles given for the main poles as they are shown in FIGS. 9 and 10.

FIG. 14C shows a sensor winding 115 for decoupling of the second harmonic. As can be easily recognized, starting from a terminal 116, the winding is first led to the right wave winding with a winding pitch of 180° electrical: L=90° in such manner as to be positioned in each case to the right of the center teeth 111 to 114. The winding direction is reversed at the end, and the winding 115 is returned again to the right to a terminal 117, but now is positioned to the left of the center teeth 111 to 114, that is, shifted by one slot partition. Thus, on both sides of the center teeth there are positioned like magnetically active coil sections, that is, in the coil sections situated at both sides of one center tooth, a voltage of the same direction is induced during operation. Such an arrangement is again electrically symmetrically relative to the stator winding 92 so that no transformer coupling occurs.

The arrangement of a sensor winding for coupling-out of a fourth harmonic in the winding construction of FIG. 14B is more difficult. Such a sensor winding requires a coil step of 180° electrical: 4=45° electrical, and since the slots 89 have a distance of 30° electrical, a magnetically active section of the sensor winding would have to be situated on a tooth end.

FIG. 14D shows the solution of this problem in accordance with the invention by providing a sensor winding 118 for the coupling-out of the fourth harmonic. This winding starts at a terminal 121 and runs from there towards the left, and in particular alternating with winding steps of 30° and 60° electrical, such that in each case a magnetically active section is situated to the left of the four center teeth 111 to 114. After passing through all slots, the winding direction is reversed and the wave winding runs again with alternation 30°— and 60°— steps through the slots toward the right to the connector 122, as shown, however shifted by a slot partitiion such that now the magnetically active sections are situated to the right of the center teeth 111 to 114. Like winding sections of both wave windings are situated for example jointly in the slots 94 and 97, and similarly like winding sections are situated on both sides of the middle teeth, that is, for example on both sides of the center tooth 111 in the slots 95 and 96. In other words: all 24 slots are at least covered once, and a third of them are covered twice. The angular distance of the doubly covered slots to the next two winding sections of opposite direction also amounts to 30° electrical and 60° electrical, that is, on the average 45° electrical, as is shown in FIG. 14D for the slot 97. This average distance corresponds to the fourth harmonic to be obtained. The angular distances of 60° and 30° electrical also present correspond to the third and sixth harmonic, which, according to FIG. 15 practically are both equal to zero and therefor do not interfere.

A doubled number of stator slots allows to couple-out the fourth and eight harmonic in analogy to FIGS. 14C and 14D. With respect to FIGS. 14C and 14D, all the pitch values would have to be halved. In other words, FIG. 14C and 14D would have to shrink to half width under consideration of the symmetry relative to the center teeth in order to avoid transformer coupling. Naturally, in accordance with the same principle, sensor windings can be constructed for other slot numbers and other harmonics. The position of the galvanomagnetic sensor 16 between two main windings is also shown in the FIGS. 5 and 14B.

FIGS. 6 to 8 and 11 to 13 show possible constructions of sensor windings for a four pole axial air gap, or flat motor. Its rotor shown in FIG. 8 of the German Patent Disclosure Document DE-OS No. 27 30 142 and its main winding correspond to the winding shown in FIG. 9 of said Patent Disclosure Document No. 27 30 142. It comprises four approximately sector shaped flat coils 101 to 104, which are positioned around a shaft 100 with equal angular distances of 180° electrical (=90° mechanical) each. The Hall-generator 16 is disposed on the bisecting line of the angle between the coils 102 and 103. The connectors of the four coils are designated in analogy to FIG. 4 with 49,50 and 51, 52, respectively. The circuit corresponds to the circuit of FIG. 4.

FIGS. 6 to 8 show sensor windings for coupling-out of the second harmonic. In FIG. 6, the magnetically active sections 105 of the sensor winding, which is herein designated as 106 (this number is therefore indicated in parentheses in FIG. 4), are located in each case on the bisecting line of the angle between the main windings 101 to 104 and on their center axes. A wave or meander shaped winding is thus obtained, and its terminals are designated in FIG. 6 as 107 and 108. The meander can be passed several times for increasing the voltage. It is important that the magnetically active sections 105 extend over the full width of the rotor magnet, which is indicated in FIG. 6 by dot-dash lines. The magnetically active sections 105 have in each case a distance from each other of 90° electrical in order to pick up only the second harmonic. The sensor winding 106 of FIG. 6 is suitable for axial air gap motors having no stray field in the direction of shaft 100. Thus, the sensor winding 106 is not transformer coupled to the main windings 101 to 104.

In case a stray flux occurs in the direction of the shaft 100, the sensor windings 106' and according to FIG. 7 and 106", according to FIG. 8, respectively, can be employed. The basic form according to FIG. 6 is employed in both cases, but in FIG. 7 the winding is looped back on the same path resulting in a doubling of the starting voltage. This arrangement also corresponds to that of FIG. 3C. In FIG. 8 the return path 110 runs around the shaft 100, but no longer across the rotor 109, that is, the latter does not induce any voltages in the return path 110 upon rotation by the stray flux parallel to the direction of the shaft. In FIG. 7 as well as in FIG. 8, the voltages which are induced in the corresponding sensor winding by the stray flux in shaft direction cancel each other. The return path 110 can also be disposed within the meander winding. In FIGS. 6 to 8 the sensor windings can be provided as a printed circuit on a thin foil and can be mounted in this form on the stator transformer-decoupled and in proper position.

FIGS. 11 and 12 show, for the same four pole motor according to FIG. 6, sensor windings for coupling-out of the fourth harmonic, that is, with a pitch of 45° electrical=22.5° mechanical between the magnetically active sections as is shown in FIGS. 11 and 12.

In FIG. 11 the sensor winding is designated as 124 and its terminals are marked 125, 126. The construction corresponds completely to that of FIG. 7, that is, the wave winding is looped back again on the same path to the exit.

In FIG. 12 the sensor winding is designated as 127 and its terminals are marked 128 and 129. The construction entirely corresponds to that of FIG. 8, that is a return path 130 is here looped back around the full shaft 100. In order to clarify the orientation relative to the main windings 101 to 104 according to FIG. 6, there, and in FIGS. 11 to 13, a dash-dot reference line 133 is drawn, running in all four figures through a magnetically active section of the corresponding sensor winding, and representing the bisecting line of the angle between the stator windings 101 and 103.

FIG. 13 shows the sensor winding 135 printed on an insulating foil 134. The magnetically active sections of the sensor winding 135 have an angular distance of 180° electrical: 15=12° electrical and are thus suitable for decoupling of the 15th harmonic or for a sixty pole tacho-magnet. A return 136 here again loops around the shaft—not shown—in order to substantially compensate for axial stray fluxes. The terminals of the winding 135 are designated as 137 and 138. In accordance with FIG. 15, the coupling-out of the 15th harmonic is less advantageous than for example the coupling-out of the 11th or 14th harmonic, which both have considerably larger amplitudes. By an appropriate selection of the angle between the magnetically active sections, such a coupling-out can easily be provided for. For the 11th harmonic the angle between two magnetically active section would be for example 180° electrical: 11.

FIG. 15 shows the frequency spectrum of the voltage shown in FIG. 10B. The amplitude $\hat{\mu}$ of the voltage shown in FIG. 10 is normalized to be 100%. It can be recognized that the fundamental of this voltage has an amplitude of about 87.8% of $\hat{\mu}$, that the second harmonic is about half the value of $\hat{\mu}$, that the fifth harmonic is about 1/5 and the eighth harmonic about ⅛ of $\hat{\mu}$. FIG. 15 is valid for a voltage with steep slopes. When the slopes are less steep, the harmonics beginning with the fifth harmonic have only very small amplitudes. Depending on the shape of the preferably trapezoidal magnetization of the rotor, there is an upper limit of the ordinal number of the harmonics which still can be employed when a sensor winding is desired with a reasonable number of turns.

The sensor windings according to FIGS. 11, 12 or 13 (especially FIG. 11), based on their compensation of stray fields independent of their origin from either the motor or the apparatus, are useful in connection with especially sensitive and fast control circuits (for example phase regulators, such as phase locked loop (PLL) circuits, which generally use a quartz standard). Such sensor windings practically do not enlarge the motor and therefore result in very compact motors. The invention can also be employed in this manner in motors having a rotor magnet field deviating considerably from a sinusoidal shape and which can be analyzed by analogy to FIGS. 10C to 10E with respect to special harmonic wave fields of different frequencies and amplitudes. This is illustrated in the following by way of additional examples of embodiments. For such other or non-sinusoidal fields, other forms of magnetization will result, as will be described below with reference to FIG. 18B or 20B.

Figure 22:
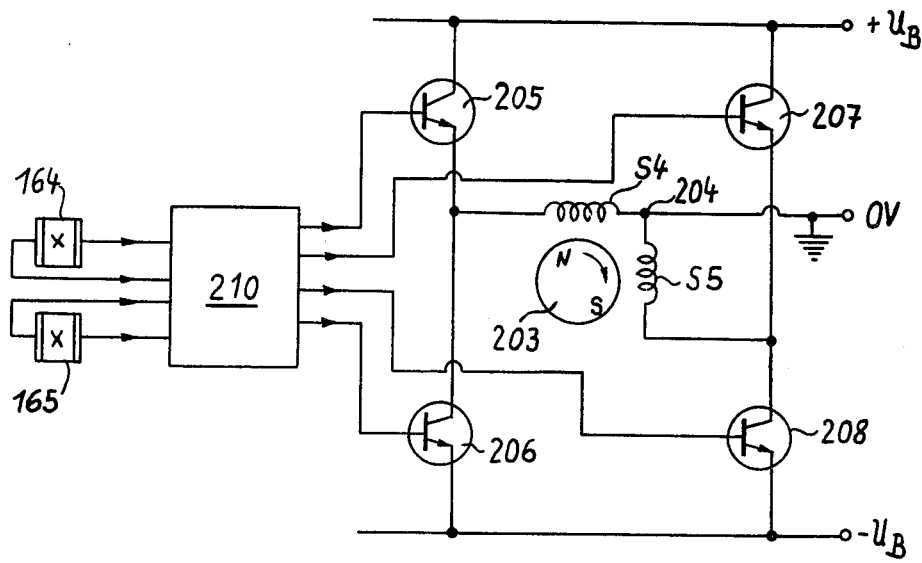

For the same or equally active parts the same reference numerals are used as in the previous figures. For purposes of unification of nomenclature, terminology is employed as is defined in the article of the inventor "Two pulse brushless d-c motors" in the Journal "Asr-digest für angewandte Antriebstechnik" Volume 1-2, 1977. FIGS. 21 and 22 of the present application correspond to FIG. 4 and FIG. 5 of that article and reference is made thereto for further illustration.

Definitions: The pole number always refers to the pole number 2p of the rotor. For example, the motors according to FIG. 16 and FIG. 19 are four pole, and those according to FIGS. 17, 18 and 20 are two pole motors. The invention is of course also useful for higher pole numbers. However, with increasing numbers of poles the distance between the magnetically active sections of the sensor winding decreases more and more.

The strand number refers to the number of separate windings of the stator and could also be designated as phase number. For example, FIGS. 16, 17, 20 and 21 show three strand motors, since the stator winding in each case comprises three separate strands, and FIGS. 18, 19 and 22 show two strand motors.

The pulse number indicates how many current pulses for the stator or drive power winding are provided for a revolution of 360° electrical. For example, in FIG. 16 upon a rotation of 360° electrical, that is, a half turn of the rotor, each of the three strands receives a current pulse when the circuit of FIG. 21 is employed, that is, three pulses are provided. FIG. 16 thus shows a three pulse, four pole motor. FIG. 17 and FIG. 20 also show three pulse motors. Upon a rotation of 360° electrical in FIG. 18, which here is a full rotor turn or revolution, two current pulses are fed to each of both stator windings by the circuit of FIG. 22, that is four current pulses. The motor is a four current pulse motor; the motor according to FIG. 19 is also four pulse.

Both three and four pulse motors generate an electromagnetic drive torque in all rotor positions, that is, such motors can start from any given rotational position. The higher the pulse number, the lower the torque variations upon rotation of the motor.

The magnetization of the rotor in FIGS. 16 to 19 has always about the same form, as is shown by way of example in FIG. 18B, that is about trapezoidal. In FIG. 20 the magnetization (FIG. 20B) of the rotor (FIG. 20C) is, about rectangular, that is it shows very steep slopes. The external rotor is in all cases constructed identically to that of external rotor 11 of FIG. 1. The rotor magnet is shown in each case in developed representation in FIGS. 16B, 17B, 18C, 19B and 20C.

The representation of the windings in the FIGS. 16 to 20 is conventional. In each case the slots of the sheet metal stamping are numbered, for example in FIG. 16A from 1' to 24', and these slots are then represented again, developed for example between FIGS. 16C and 16D, showing the exact relation to the developed windings. It can be clearly recognized which windings are disposed in which slot and how these windings are connected. Current direction is conventionally shown: a dot indicates that the current flows out of the plane of the figure and a cross that the current flows into the plane. The direction is arbitrarily fixed in the developed representations. The sensor winding of course has alternating current flowing therein during operation and not a d-c.

The Hall-generators and other sensors are shown in each case in their position in the sheet metal stamping and in the developed representation. Their designation agrees with the designation in FIGS. 21 and 22, respectively. The same sheet metal stamping 88 employed in FIG. 16 as is in FIG. 2; 24 slots 89 are provided, which are designated sequentially from 1' to 24'. A short pitch three strand main or drive power or armature winding 130 is provided, and its three strands are designated as 131, 132 and 133. The three Hall-generators controlling these strands are disposed as follows:

Hall-generator 134 is disposed between slots 6' and 7' and controls strand 131,

Hall-generator 135 is disposed between slot 10' and 11' and controls strand 132, Hall-generator 136 is disposed between slot 14' and 15' and controls strand 133.

The sensor winding 137 (FIG. 16D) covers the third harmonic and has therefore between its magnetically active sections a distance alpha of 180° electrical: L=60° electrical, that is, in FIG. 16D 30° mechanical, since the rotor is four pole. The sensor winding 137 comprises two wave windings, that is, one wave winding 139 running from the connector or terminal 138 towards the right, and one wave winding 141 running towards the left, or backward to the other terminal or connector 140 which is shifted with respect to the wave winding 139 by an angle beta in space, wherein beta=90° electrical/L (=90° electrical/: 3=30° electrical; L=ordinal number of the harmonic wave to be covered).

The phase position relative to the main winding 130 is selected such as to exclude transformer coupling with the main winding. The main winding 131 starts in the slot 1', the main winding 132 in the slot 3', and the main winding 133 in the slot 5'. The sensor winding 137 runs from connector 138 to the slot 2', then back through the slot 3', then through the slots 5', 7', 9', . . . 23' to slot 1' and from there back to slot 24' and then to slot 22',20', . . . 6', 4' to the connector 140.

Figure 16E:
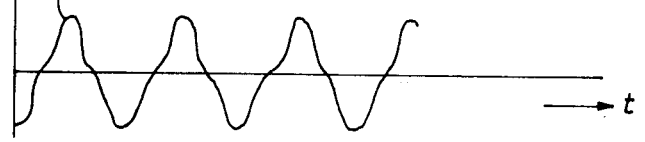

The shape of the voltage $u_T$ induced in the sensor winding 137 is shown in FIG. 16E. Obviously, this voltage comprises harmonics, however, the distance of the zero crossover passages is very uniform and therefore this voltage is very suitable for control purposes. Therefore, FIG. 16 represents the most preferred mode of the invention.

If with the sheet metal stamping a full pitch, three strand main winding is employed, the sensor winding cannot be positioned in the slots 89 without being transformer-coupled with the main winding. A solution suitable for this case is shown in FIG. 17, wherein the sensor winding again is employed for (FIG. 17D) obtaining or coupling-out of the third harmonic. The sheet metal stamping 145 according to FIG. 17A is provided with six symmetrically distributed, salient T-poles 146 with a concentrated full pitch, three strand main winding 147, the three strands of which are designated as 148, 149 and 150. The individual strands are positioned diametrically, that is, in the main slots A-G; C-J; E-L.

Slots B, D, F, H, K and M are provided for the sensor winding 146 with the stator poles. The sensor winding 146 is a wave-winding. It runs from the slot B with a winding pitch of 180° electrical a/e, i.e. L=60° electrical toward the right until slot B, and from there in the same way backward to the slot D. The form of the voltage induced in the sensor winding 153 during operation can be recognized from FIG. 17E. The three Hall-generators or other equivalent sensors are disposed as follows:

Hall-generator 34 is disposed at slot A and controls strand 148.

Hall-generator 135 is disposed at slot E and controls strand 150.

Hall-generator 136 is disposed at slot J and controls strand 149.

The control circuit is shown in FIG. 21. Transformer coupling between the sensor and the main windings can also be avoided in two-stranded winding strands shifted 90°-electrical. This is shown in FIGS. 18 and 19. FIG. 18 shows a two pole, two strand motor with a full pitch main winding 159 (FIG. 18E) inserted in a sheet metal stamping 160 with four symmetrical salient T-poles 161, that is, in the four main slots A, C, E and G. The two strands of the main winding 159 are designated as 162 and 163 and wound across the motor diameter as indicated in FIG. 18A. Two Hall-generators 164, 165 are provided in a relatively shifted position of 90° electrical, of which the one is situated at the slot C and controls the strand 163, whereas the other is situated at slot E and controls the strand 162.

Four auxiliary slots B, D, F and H are provided for receiving the sensor winding 166. Starting at slot A clockwise, then B is spaced from A by 60° and D from A by 120°. Starting at slot A counterclockwise, then H is spaced from A by 60° and F from A by 120° as is clearly shown in FIG. 18A.

Starting with a terminal 167, the sensor winding 166 runs initially through slot A, then the slots B, D, F and H, and returns to slot A. There the winding direction reverses back to slot H, and further to the slots D and B, and to the second connector 168. Thus the winding step is 180° electrical: L, that is, 60° electrical. However, in the center of the developed representation in each case two winding steps have been left out, that is, two winding steps for each pair of poles p, in order to avoid transformer coupling between the main winding 159 and the sensor winding 166. Correspondingly, in a four pole motor, two times two winding steps would have to be left out, and, subsequently, a rotation symmetrical winding is obtained providing the foregoing advantages, since thereby partition errors of the rotor magnet are better compensated. The corresponding circuit for four pulse operation is shown in FIG. 22. The shape of the tacho-voltage $u_T$ at the sensor winding 166 is shown in FIG. 19E. This voltage varies corresponding to the fundamental of the magnetization of the rotor magnet; however, the distances of the zero passages are relatively uniform and can therefore be used for control purposes.

If it is desired to use a conventional sheet metal stamping, for example the sheet metal stamping 88 according to FIG. 2 with 24 slots 89, also for a two stranded, four pulse motor, then, according to the invention, a sensor winding can be provided for coupling-out of the third harmonic, by spacial phase shifting of part of the sensor winding by 30° electrical (with reference to the pole distribution of the rotor magnet) versus the other part, and by additional omission of some winding slots. The transformer coupling can be avoided relative to both strands of the main winding. Such a motor is shown in FIG. 19. The sheet metal stamping 88 has 24 slots 89 which are designated as 1' to 24' as in FIG. 16. The rotor uses four poles (compare FIG. 19B), and the main winding has two strands 172, 173. The Hall-generator 164 is located between the slots 12' and 13' and controls the strand 172. The Hall-generator 165 is located between the slots 15' and 16' controls the strand 173. The distance between the two Hall-generators 164 and 165 thus is 90° electrical=45° mechanical. The course of the main winding 171 is shown in FIGS. 19A and 19C. The main winding 171 is 5/6 short-pitched. FIG. 19D shows the position of the sensor winding 175. Starting with a terminal 176, winding 175 extends through the slots 4', 7', 9', 11', 16', 19', 21' to the slot 23', and from there back again through the slots 21', 18', 16', 14', 9', 6', 4' and 1' to the other connector 177. Like the sensor winding 166, the sensor winding 175 is also mirror symmetrical and also leaves out two slots in each case. Furthermore, the sensor winding 175 comprises four sections 178, 179, 180 and 181, which are shifted against each other. In each of the four sections the same pitch of 180° electrical/L=60° electrical is employed, for example, from slot 2' to slot 4', and from slot 4' to slot 6'. The sections 178 and 180 are in phase, as are the sections 179 and 181. The section 178 is shifted in phase compared to the sections 179 and 181 by an angle gamma of 90° electrical: L=30° electrical, and the same holds for the section 180. Through this move and the omission of the center winding loops, it is—surprisingly—possible to avoid, also in this case, transformer coupling with both strands of the main winding 171. FIG. 19E shows the shape of the voltage $u_T$ at the sensor winding 175. The voltage comprises a small part of the fundamental wave of the rotor magnet. The ninth harmonic, with a rotor magnet (FIG. 20C) having an approximately rectangular magnetization as shown in FIG. 20 is illustrated in FIG. 20, collectively. FIG. 20B shows the induction curve in the direction of rotation, and measured over the circumference of the rotor. The sensor winding 185 has to have a sensor pitch corresponding to a ninth of the pitch of the main winding 186, that is, only about 20° electrical. In a small or tiny motor, in general, the slot number of 9×2p required for this cannot be used for the main winding. Thus, according to the invention a stator arrangement with salient poles 187 and a concentrated main winding 186 is more suitable. The winding 186 is short-pitched and is disposed in three main slots A, G and N. The three strands of the main winding 186 are designated as 188, 189 and 190. In addition, 15 auxiliary slots B–F, J–M and O–S are provided having, in each case, a distance from each other of 20° electrical=20° mechanical and from the main slots A, G and N, compare FIG. 20A.

The Hall-generators 134 to 136 are arranged as follows:

The Hall-generator 134 is disposed between the slots H and J and controls the strand 188.

The Hall-generator 135 is disposed between the slots O and P and controls the strand 189.

The Hall-generator 136 is disposed between the slots B and C and controls the strand 190.

This is shown in FIG. 20 symbolically.

The sensor winding 185 is constructed as a wave winding. It starts at terminal 193, continues to the slot A and from there further through all slots B, C, etc. until it returns to slot A and turns there and returns via all slots S, R, Q, etc. to slot B, and to the other connector 194. No coupling between the sensor winding 185 and the main winding 186 occurs—compare FIGS. 20D and 20E. At the terminals 193 and 194 a frequency is obtained which is nine times higher than the frequency available at the Hall-generators 134 to 136 and therefore provides for good speed control.

FIG. 21 shows schematically the permanent magnetic rotor 195 of a three pulse motor having three winding strands connected as a star and designated as S1 to S3. The star point 196 is connected to the positive voltage $U_B$. Three npn-transistors 197, 198, 199 are provided for feeding these three strands. In each case the transistors are connected with their collector to the corresponding strand and with their emitter to the negative line 200, that is, ground. The Hall-generator 134 controls the transistor 197, the Hall-generator 135 the transistor 198 and the Hall-generator 136 the transistor 199. This control is only represented schematically: Normally, the control is provided by driver transistors.

In FIG. 16, for example, the strands S1 to S3 would correspond to the strands 131 to 133; in FIG. 17, the strands 148 to 150; and in FIG. 20, the strands 188 to 190. During each revolution of the rotor 195 of 360° electrical, each of the three strands S1 to S3 successively receives a current pulse, that is, in total three pulses and the operation is three pulse. A torque is generated since the three current pulses mutually overlap.

FIG. 22 shows, schematically, the rotor 203 of a four pulse motor having two strands designated as S4 and S5 and connected with their star point to ground (0 volt). The other connection of the strand S4 is to the emitter of an npn-transistor 205 and the collector of an npn-transistor 206. In the same way, the other connection of the strand S5 is connected to the emitter of an npn-transistor 207 and to the collector of an npn-transistor 208. The collectors of the transistors 205 and 207 are connected to the positive voltage $+U_B$, and the emitters of the transistors 206 and 208 are connected to a negative voltage $-U_B$. For example, when the transistor 206 is conducting, a current flows in the other direction through S4, and when the transistor 206 is conducting, a current flows in the other direction through S4. Because of the symmetry of the circuit, the same holds for S5 and the two transistors 207 and 208. A control device 210 provides control of the two transistors 205 to 208. Rotor position signals are fed to the control device 210 from the two Hall-generators 164 and 165. The transistors 205, 207, 206 and 208 are successively excited, resulting in a rotating field driving the rotor 203. In FIG. 18 the strands S4 and S5 correspond to the strands 162 and 163, in FIG. 19 the strands 172 and 173. The present invention permits to obtaining, with very simple means, a measuring voltage with a high frequency relative to the speed of rotation of the motor and frequency of operation pulses, and with a relatively uniform period of duration as is required especially for speed control employing frequency as a measure of the speed of rotation. The sensor winding which is used as a high pass filter, and should preferably extend over 360° electrical or an integer multiple thereof mathematically $n \cdot 360°-el$ in which $n=1, 2, \ldots$ in order to minimize partition errors, for example, from an unequal distribution of the slots or a nonuniform magnetization of the rotor, and in order to obtain a very uniform operation. Interference from axial stray fields in axial air gap motors can be eliminated.

I claim:

1. Brushless d-c motor having
a permanent magnet rotor, the poles of which have a non-sinusoidal magnetization, separated by pole gaps;
a stator, and an armature winding located in the stator;
means for pulse energizing the armature winding;
and a sensor winding positioned on the stator adjacent the armature to provide output signals induced in the sensor winding upon operation of the motor, representative of rotor position with respect to the sensor winding,
wherein the sensor winding includes a first portion having a first winding angle of 180°−el/L,
wherein L is the ordinal of a harmonic to be obtained from the sensor winding,
and then a second portion having the same average winding angle but wound in reverse direction to compensate for stray fields permeating the sensor winding, said sensor winding being positioned on the armature to provide output signals which are a harmonic or multiple of the base frequency induced in stationary conductors located on the stator upon rotation of the motor;
and wherein
the sensor winding has a winding pitch which is different from the pitch of the armature winding and comprises magnetically active portions which are located essentially intermediate neighboring magnetically active portions of the armature winding to avoid transformer coupling between the armature winding and the sensor winding.

2. Brushless d-c motor comprising
a permanent magnet rotor, the poles of which have at least an approximately trapezoidal or rectangular magnetization, separated by pole gaps;
a stator having a slotted core with teeth and slots circumferentially distributed thereover, and an armature winding located in the slots of the stator;
an essentially cylindrical air gap separating the rotor and the stator;
means for pulse energizing the armature winding;
and a sensor winding, placed in slots of the stator and positioned, successively, in the same direction in a preset number of times, with an average distance of 180°−el/L between two neighboring winding sections
wherein L is the ordinal of the harmonic to be obtained from the sensor winding, said sensor winding being positioned adjacent the armature to provide output signals induced in the sensor winding upon rotation of the motor, representative of the rotor with respect to the sensor winding, and providing output signals which are a harmonic or multiple of the base frequency induced in stationary conductors located on the stator upon rotation of the motor;
wherein the sensor winding is a wave winding;
and wherein, to avoid transformer coupling between the armature winding and the sensor winding,
said sensor winding has a winding pitch which is different from the pitch of the slots and includes magnetically active portions (FIG. 17A: 153; FIG. 20A: 185, D, K, Q) positioned in slots (FIG. 17A: B, D, F, H, K, M; FIG. 20A: D, K, Q) which are located essentially intermediate two neighboring slots in which filaments of the armature winding are located.

3. Motor according to claim 1, wherein the motor is an axial air gap motor.

4. Motor according to claim 1, wherein the motor is an axial air gap motor and both said first portion and said second portion of the sensor winding (106', 124) comprise a wave winding.

5. Motor according to claim 1, wherein the motor is an essentially cylindrical air gap motor.

6. Motor according to claim 1, wherein said armature winding comprises a multi-strand or multi-filament winding.

7. Motor according to claim 1, wherein said armature winding comprises a two-strand or two-filament winding.

8. Motor according to claim 1, wherein (FIG. 9) the rotor has two pole divisions including, within 300°−el, a first monopole zone of about 120°−el of one polarity, a second monopole zone of about 120°−el opposite polarity, and an angular range of about 120°−el of dipole zones of essentially equal and opposite magnetic lux, to induce substantially zero voltage in a conductor extending over the full width of the rotor upon operation of the motor, and wherein the sensor winding is positioned to be responsive to the second, fourth or eighth harmonic.

9. Motor according to claim 1, wherein said stator is a coreless stator, and said armature winding is a coreless armature winding.

10. Motor according to claim 2 wherein the sensor winding has a forwardly—in the direction of rotation of the motor—wound portion and a reverse wound portion;

and wherein the reverse wound portion of the sensor wave winding is spacially shifted relative to the forward portion.

11. Motor according to claim 10 wherein the forward portion and the backward portion are spatially shifted with respect to each other by an angle of 90°−el/L
wherein L is the ordinal number of the harmonic to be obtained from the sensor winding.

12. Brushless d-c motor comprising
a stator having a slotted core with teeth and slots circumferentially distributed thereover, and an armature winding located on the stator;
a permanent magnet rotor having a non-sinusoidal magnetization (FIG. 18B; FIG. 20A);
an essentially cylindrical air gap separating the rotor and the stator;
a sensor winding (FIG. 17D; FIG. 20D) located on the stator and having magnetically active portions (153, 185) with an average distance of 180° el./L between two neighboring magnetically active portions,
wherein L is the ordinal of the harmonic to be sensed by the sensor winding,
to sense said L-th harmonic (FIG. 17E) of voltage induced by the rotor, when the motor is in operation,
wherein the stator winding is a multi-filament winding (148, 149, 150; 188, 189, 190) located in the slots (FIG. 17A: A, C, E, G, J, L; FIG. 20A: A, G, N) of the stator core and wherein, to avoid transformer coupling between the armature winding and the sensor winding,
said sensor winding has a winding pitch which is different from the pitch of the slots and includes magnetically active portions (FIG. 17A: 153; FIG. 20A: 185, D, K, Q) aligned with slots (FIG. 17A: B, D, F, H, K, M; FIG. 20A: D, K, Q) which are located essentially intermediate two neighboring slots in which filaments of the armature winding are located.

13. Motor according to claim 12, wherein said multi-filament stator winding is a three-filament winding, located in 3n slots of the stator, wherein n=1, 2, 3 . . .

14. Motor according to claim 12, in combination with a speed control circuit,
said speed control circuit having pulse generating means connected to the pulse energization means of the armature winding;
and an actual speed signal input means connected to said sensor winding and responsive to the particular harmonic of said base frequency.

15. Motor according to claim 12, wherein (FIG. 9) the rotor has two pole divisions including, within 300°−el, a first monopole zone of about 120°−el of one polarity, a second monopole zone of about 120°−el opposite polarity, and an angular range of about 120°−el of dipole zones of essentially equal and opposite magnetic flux, to induce substantially zero voltage in a conductor extending over the full width of the rotor upon operation of the motor, and wherein the sensor winding is positioned to be responsive to the second, fourth or eighth harmonic.

16. Motor according to claim 12 wherein the sensor winding is positioned relative to the armature winding such that the sum of the voltages which are transformer-coupled by the armature winding into the sensor winding is substantially zero.

17. Motor according to claim 16 wherein the sensor winding is located mirror symmetrically relative to the armature winding.

18. Motor according to claim 12 wherein the stator has a slotted core with intervening teeth, the core having, in the middle of the armature winding poles, a middle or central tooth;

and wherein like magnetically active winding sections of the sensor winding are located in slots at both sides of the middle tooth or central tooth.

19. Motor according to claim 12 wherein the armature windings have predetermined pitch;

and the sensor winding is wound with non-uniform pitch to provide sensor conductors spaced circumferentially of the motor with alternatingly larger and smaller distances, and wherein the arithmetic mean of the larger and smaller distances between the sensor conductors corresponds at least approximately to an average sensor pitch, to permit locating the sensor winding on a stator which has a configuration in conflict with a theoretically calculated sensor winding pitch to obtain the desired harmonic.

20. Motor according to claim 12, wherein the armature winding (FIG. 17D) is an essentially full-pitch winding.

21. Motor according to claim 12, wherein the armature winding is a concentrated winding (FIG. 17D, FIG. 20D).

22. Motor according to claim 12, wherein the sensor winding (FIG. 17D) includes three uniformly distributed magnetically active portions (153) for each pole of the rotor to sense the third harmonic.

23. Motor according to claim 12, wherein the sensor winding (FIG. 20E) includes nine uniformly distributed magnetically active portions (185) for each pole of the rotor to sense the ninth harmonic.

24. Motor according to claim 12, wherein the stator has salient poles;

and auxiliary slots are formed in the salient poles, the sensor windings being located in said auxiliary slots.

25. Motor according to claim 24, wherein the number of salient stator poles is greater than the number of the rotor poles.

26. Motor according to claim 12, wherein the magnetization of the rotor is essentially trapeze-shaped (FIG. 17B, FIG. 18B);

and sequential rotor poles are magnetized over a distance of approximately 180°−el in similar shape and manner of magnetization with respectively reverse direction of the magnetic field or polarity.

27. Motor according to claim 12, wherein the magnetization of the rotor is approximately rectangular (FIG. 20B, FIG. 20C);

and in which sequential rotor poles have a length of approximately 180°−el of essentially similar shape and form of magnetization, but with respectively reverse polarity or direction of magnetization.

28. Motor according to claim 12, wherein the sensor winding is a single-phase winding.

29. Motor according to claim 12, wherein the sensor winding extends over n×360°−el, in which n=1, 2 . .

* * * * *